United States Patent
Hoshino

(10) Patent No.: US 9,473,564 B2
(45) Date of Patent: Oct. 18, 2016

(54) INFORMATION PROCESSING SYSTEM, INFORMATION PROCESSING METHOD, AND NON-TRANSITORY COMPUTER READABLE MEDIUM FOR SPECIFYING INSTALLED SOFTWARE APPLICATION

(71) Applicant: Fuji Xerox Co., Ltd., Minato-ku, Tokyo (JP)

(72) Inventor: Takashi Hoshino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 234 days.

(21) Appl. No.: 14/220,762

(22) Filed: Mar. 20, 2014

(65) Prior Publication Data

US 2015/0046561 A1    Feb. 12, 2015

(30) Foreign Application Priority Data

Aug. 9, 2013  (JP) ................. 2013-165860

(51) Int. Cl.
| | |
|---|---|
| *G06F 15/16* | (2006.01) |
| *H04L 29/08* | (2006.01) |
| *H04L 29/06* | (2006.01) |
| *G06F 9/445* | (2006.01) |
| *H04L 12/24* | (2006.01) |

(52) U.S. Cl.
CPC ............... *H04L 67/10* (2013.01); *G06F 8/60* (2013.01); *H04L 69/22* (2013.01); *H04L 41/0213* (2013.01)

(58) Field of Classification Search
CPC .... H04L 67/10; H04L 69/22; H04L 41/0213
See application file for complete search history.

(56) References Cited

U.S. PATENT DOCUMENTS

| | | | | |
|---|---|---|---|---|
| 8,583,722 | B1* | 11/2013 | Gibson | G06F 11/2294 702/119 |
| 9,143,889 | B2* | 9/2015 | Liu | H04W 12/04 |
| 2004/0117481 | A1 | 6/2004 | Arimoto et al. | |
| 2004/0193896 | A1 | 9/2004 | Kaneko | |
| 2006/0288056 | A1 | 12/2006 | Yamakawa et al. | |
| 2009/0247136 | A1 | 10/2009 | Srinivasan et al. | |
| 2011/0099273 | A1 | 4/2011 | Ide et al. | |
| 2012/0042049 | A1 | 2/2012 | Miyazaki et al. | |
| 2013/0011025 | A1* | 1/2013 | Liu | H04W 12/04 382/118 |

FOREIGN PATENT DOCUMENTS

| | | |
|---|---|---|
| JP | 1999032078 A | 2/1999 |
| JP | 2003196099 A | 7/2003 |
| JP | 2004-135228 A | 4/2004 |
| JP | 2004-246880 A | 9/2004 |
| JP | 2004-302656 A | 10/2004 |

(Continued)

OTHER PUBLICATIONS

Office Action issued by Japanese Patent Office in corresponding Japanese Patent Application No. 2013165860, dated Mar. 18, 2014.

*Primary Examiner* — Moustafa M Meky
(74) *Attorney, Agent, or Firm* — Sughrue Mion, PLLC

(57) ABSTRACT

An information processing system includes a packet receiving unit, a registration unit, and a software specification unit. The packet receiving unit receives a packet flowing in a communication network. The registration unit registers one or more devices connected to the communication network. The software specification unit specifies a software application installed in a registered device among the one or more registered devices, on the basis of information regarding a file contained in the packet, the packet being transmitted or received by the registered device.

3 Claims, 18 Drawing Sheets

(56) References Cited

FOREIGN PATENT DOCUMENTS

| JP | 2006350829 A | 12/2006 |
| JP | 2007-019981 A | 1/2007 |
| JP | 2007-272717 A | 10/2007 |
| JP | 2007-279835 A | 10/2007 |
| JP | 2008234544 A | 10/2008 |
| JP | 2009-238065 A | 10/2009 |
| JP | 2011-090512 A | 5/2011 |
| JP | 2012-038213 A | 2/2012 |
| JP | 2012-208679 A | 10/2012 |

* cited by examiner

FIG. 6

```
GET /webhp?hl=ja HTTP/1.1
Host: www.google.co.jp
User-Agent: Mozilla/5.0 (Windows NT 5.1; rv:19.0) Gecko/20100101 Firefox/19.0
```

FIG. 7

| ID | MAC ADDRESS | VENDOR | IP ADDRESS | PRODUCT NAME | OS | DEVICE TYPE | INSTALLED APPLICATION |
|---|---|---|---|---|---|---|---|
| 1 | 001E4FF4D3XX | A | 10.0.0.1 | | Windows XP | PC? | FireFox19 |

FIG. 8

```
GET /iaction/adoapn_AppNexusDemoActionTag_1 HTTP/1.1
Host: view.atdmt.com
User-Agent: Mozilla/5.0 (X11; U; Linux i686; ja; rv:1.9.0.18) Gecko/2010021718
CentOS/3.0.18-1.el5.centos Firefox/3.0.18
```

FIG. 9

| ID | MAC ADDRESS | VENDOR | IP ADDRESS | PRODUCT NAME | OS | DEVICE TYPE | INSTALLED APPLICATION |
|---|---|---|---|---|---|---|---|
| 1 | 001E4FF4D3XX | A | 10.0.0.1 | | Windows XP --------- CentOS | PC? | FireFox19 VIRTUAL MACHINE? --------------- FireFox3.0.18 |

FIG. 10

| DATE AND TIME | ID | MAC ADDRESS | IP ADDRESS DURING ANALYSIS | TRANSMISSION-SOURCE IP ADDRESS OF PACKET | DESTINATION IP ADDRESS OF PACKET | PROTOCOL | ACQUIRED INFORMATION |
|---|---|---|---|---|---|---|---|
| 01/10/2012 17:43 | 1 | 001E4FF4D3XX | 10.0.0.1 | 10.0.0.1 | 123.45.67.xxx | HTTP | OS:Windows XP APPLICATION :FireFox19 |
| ... | | | | | | | |
| 01/12/2013 10:00 | 1 | 001E4FF4D3XX | 10.0.0.3 | 10.0.0.3 | 98.76.54.xx | HTTP | OS:CentOS APPLICATION :FireFox3.0.18 |

FIG. 11

| ID | MAC ADDRESS | VENDOR | IP ADDRESS | PRODUCT NAME | OS | DEVICE TYPE | INSTALLED APPLICATION |
|---|---|---|---|---|---|---|---|
| 1 | 001E4FF4D3XX | A | 10.0.0.1 | | CentOS | PC? | FireFox3.0.18 |

FIG. 12

```
GET / pub/ exe/docuworks/ dwvlt732jpn.exe HTTP/ 1.1
Host: download.xxxxxxxxx.co.jp
User-Agent: Mozilla/ 5.0 (Windows NT 6.1; rv:21.0) Gecko/ 20100101 Firefox/21.0
                    :
```

FIG. 13

```
GET /.../pukiwiki.php    HTTP/1.1
Host: view.atdmt .com
User-Agent: Mozilla/5.0 (X11; U; Linux i686; ja; rv:1.9.0.18) Gecko/2010021718
CentOS/3.0.18 -1.el5.centos Firefox/3.0.18
```

FIG. 14

```
HTTP/1.1 200 OK
Date: Mon, 01 Jul 2013 11:55:08 GMT
Server: Apache
           :
```

FIG. 15

| ID | MAC ADDRESS | VENDOR | IP ADDRESS | PRODUCT NAME | OS | DEVICE TYPE | INSTALLED APPLICATION |
|---|---|---|---|---|---|---|---|
| 1 | 001E4FXXXXXX | A | 10.0.0.100 | | | SERVER? | PukiWiki |

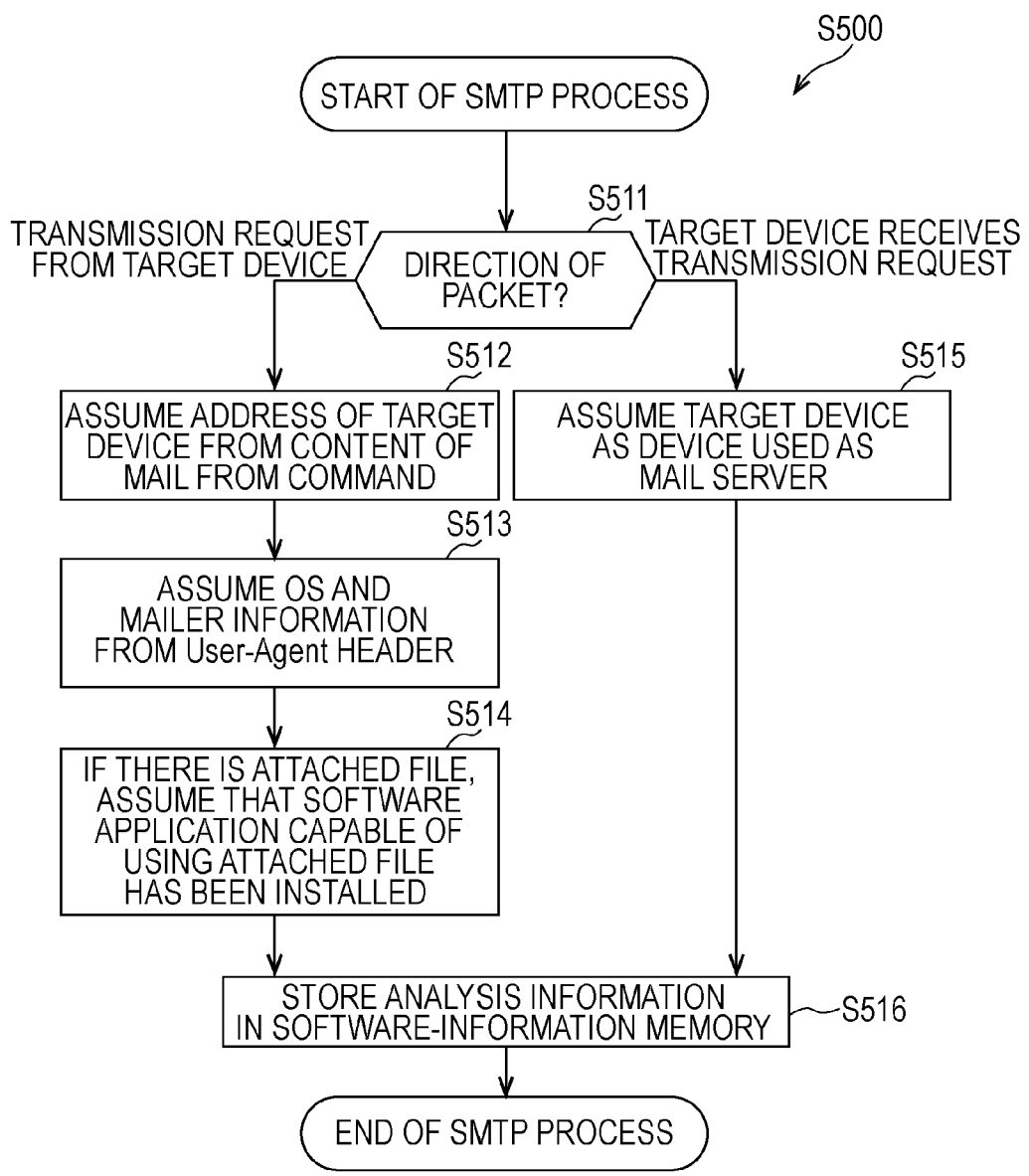

FIG. 18

```
EHLO [10.0.0.1]
HELO [10.0.0.1]
MAIL FROM:<yyy@xxx..xxx.com>
RCPT TO:<zzz@xxx.xxx.com>
DATA
Message-ID: <51D171C1.70509@xxx.xxx.com>
Data: Mon, 01 Jul 2013 21:10:41 +0900
From: <yyy@xxx..xxx.com>
User-Agent:Mozilla/5.0(Windows NT 6.1; rv:17.0) Gecko/20130620 Thunderbird/17.0.7
MIME-Version: 1.0
To: zzz@xxx.xxx.com
Subject: =?ISO2022-JP?B?GyRCJSQlcyU5JU ghPCVrGyhC?=
Content-Type: multipart/ mixed;
boundary="------------070907060801030301040803"

This is a multi-part message in MINE format.
--------------070907060801030301040803
Content-Type: text/plain;charset=ISO-2022-JP
Content-Transfer-Encoding: 7bit --------------070907060801030301040803
Content-Type: application/ octet-stream;
name="dwvlt732jpn.exe"
Content-Transfer-Encoding: base64
Content-Disposition: attachment;
filename="dwvlt732jpn.exe"
    :
```

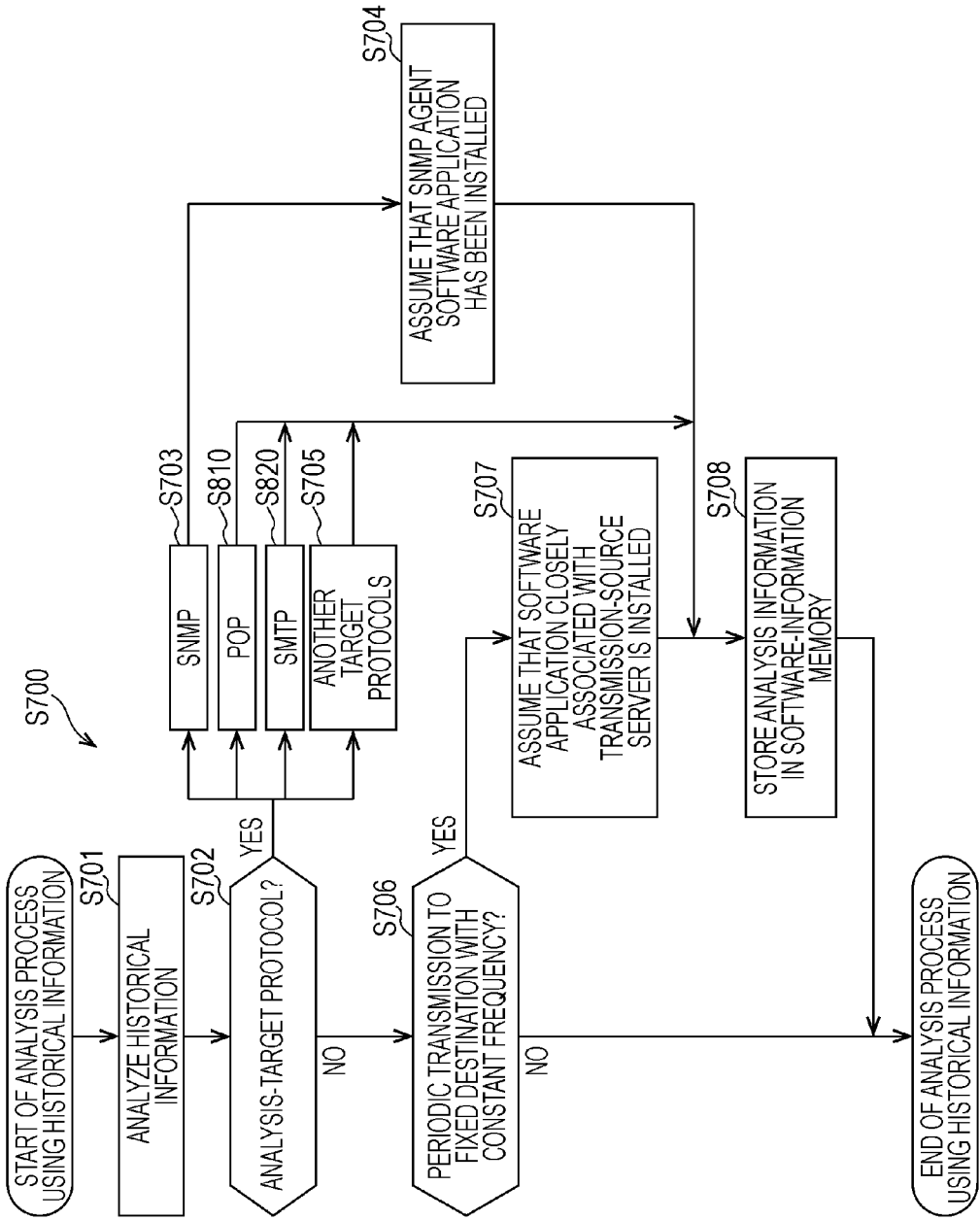

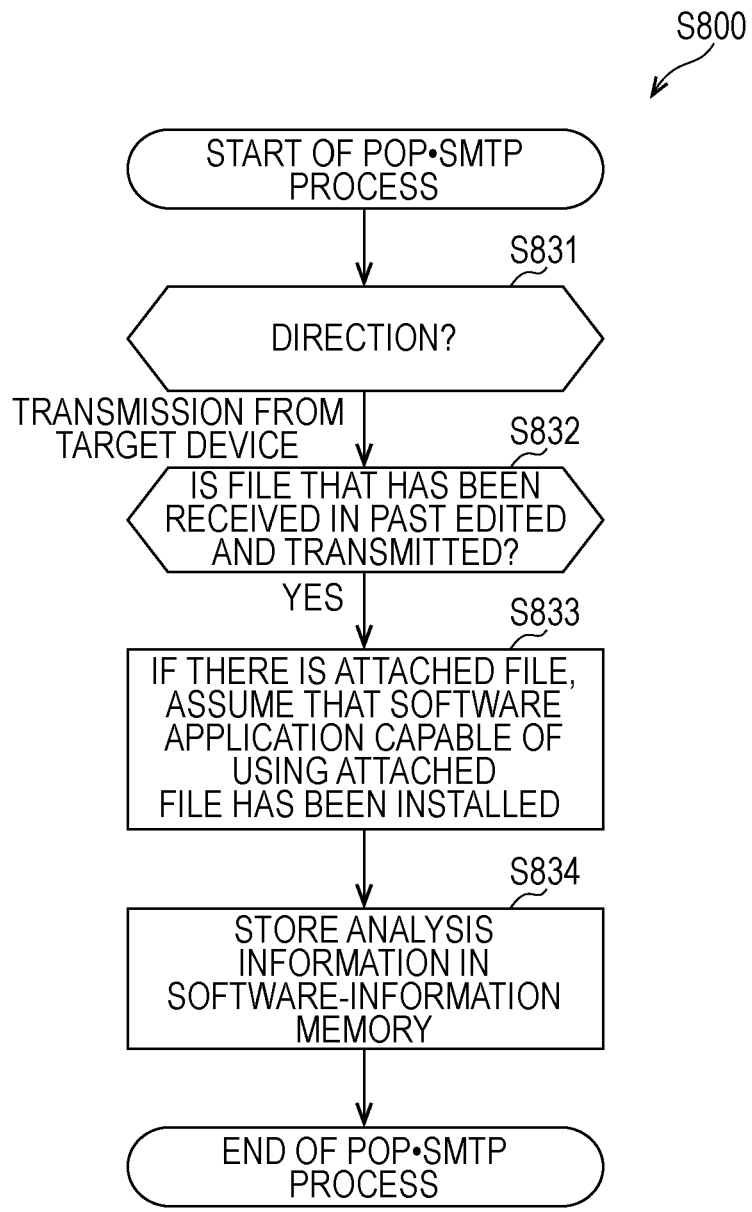

FIG. 21

| DATE AND TIME | TRANSMISSION-SOURCE ID | TRANSMISSION-SOURCE MAC ADDRESS | TRANSMISSION-DESTINATION ID | TRANSMISSION-DESTINATION MAC ADDRESS | ATTACHED FILE NAME | HASH VALUE OF FILE | PROTOCOL | ACQUIRED INFORMATION |
|---|---|---|---|---|---|---|---|---|
| 01/20/2013 17:43 | 20 | 001E4FF4D3XX | 21 | 002326FC98XX | aaa.xdw | 08f6e0260c 64418510ce fb2b06eee5 cd | smtp | ID20: DocuWorks (EDITOR) |
| 01/12/2013 10:00 | 21 | 002326FC98XX | 20 | 001E4FF4D3XX | aaa.xdw | 47bce5c74f 5894467dbd 57e9ca9f808 | smtp | ID20, 21: DocuWorks (VIEWER) |

FIG. 22

| ID | MAC ADDRESS | VENDOR | IP ADDRESS | PRODUCT NAME | OS | DEVICE TYPE | INSTALLED APPLICATION |
|---|---|---|---|---|---|---|---|
| 20 | 001E4FF4D3XX | A | 10.0.0.101 | | | PC? | DocuWorks (VIEWER, EDITOR) |
| 21 | 002326FC98XX | B | 10.0.0.102 | | | PC? | DocuWorks (VIEWER) |

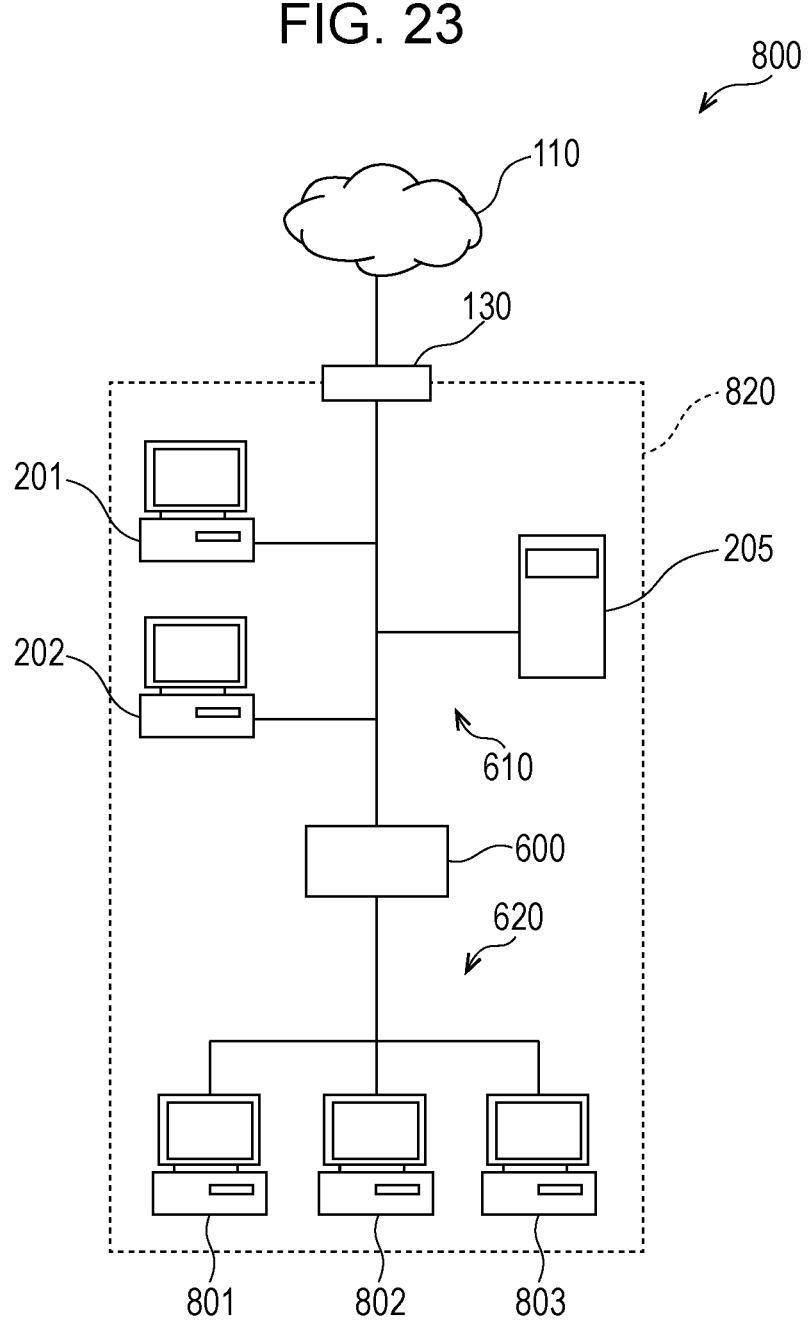

US 9,473,564 B2

INFORMATION PROCESSING SYSTEM, INFORMATION PROCESSING METHOD, AND NON-TRANSITORY COMPUTER READABLE MEDIUM FOR SPECIFYING INSTALLED SOFTWARE APPLICATION

CROSS-REFERENCE TO RELATED APPLICATIONS

This application is based on and claims priority under 35 USC 119 from Japanese Patent Application No. 2013-165860 filed Aug. 9, 2013.

BACKGROUND (i) Technical Field

The present invention relates to an information processing system, an information processing method, and a non-transitory computer readable medium.

(ii) Related Art

Use of information communication terminals via a network such as the Internet has become popular, the information communication terminals transmitting and receiving information. In a network used in an office or the like, it is effective to know, in advance, information on devices connected to the network for detecting malfunction of devices connected to the network, addressing troubles of the network, improving the throughput of the network, and the like.

In recent years, various devices have become capable of being connected to a network, and devices in which an information collection agent program is unable to be installed are connected to the network in many cases. In addition, the same type of devices connected to a network may often use the network differently depending on software applications installed therein after purchase. Thus, it is difficult to determine the latest information on devices connected to a network.

SUMMARY

According to an aspect of the invention, there is provided an information processing system including a packet receiving unit, a registration unit, and a software specification unit. The packet receiving unit receives a packet flowing in a communication network. The registration unit registers one or more devices connected to the communication network. The software specification unit specifies a software application installed in a registered device among the one or more registered devices, on the basis of information regarding a file contained in the packet, the packet being transmitted or received by the registered device.

BRIEF DESCRIPTION OF THE DRAWINGS

Exemplary embodiments of the present invention will be described in detail based on the following figures, wherein:

FIG. 6 is a diagram illustrating a portion of a header of a communication message transmitted from a target device via HTTP;

FIG. 7 is a diagram illustrating an example of information saved in a software-information memory on the basis of the information illustrated in FIG. 6;

FIG. 8 is a diagram illustrating a portion of a header of a communication message transmitted from a target device via HTTP;

FIG. 9 is a diagram illustrating an example of information saved in the software-information memory on the basis of FIGS. 6 and 8;

FIG. 10 is a diagram illustrating information on communication messages transmitted from a single connected device at different times, the communication messages being recorded in a historical-information memory;

FIG. 11 is a diagram illustrating an example of information saved in the software-information memory on the basis of the information illustrated in FIG. 10;

FIG. 12 is a diagram illustrating a portion of a header of a communication message transmitted from a target device via HTTP;

FIG. 13 is a diagram illustrating a portion of a header of a communication message received by a target device via HTTP;

FIG. 14 is a diagram illustrating an example of a message transmitted by an HTTP server;

FIG. 15 is a diagram illustrating an example of information saved in the software information memory on the basis of the information illustrated in FIG. 13;

FIG. 17 is a flowchart illustrating an example of a SMTP process;

FIG. 18 is a diagram illustrating an example of an SMTP message;

FIG. 19 is a flowchart illustrating an analysis process using historical information;

FIG. 20 is a flowchart illustrating the POP process and the SMTP process;

FIG. 21 is a diagram illustrating information on communication messages with which files having the same name have been transmitted and received at different times, the communication messages being recorded in the historical-information memory;

FIG. 22 is a diagram illustrating an example of information saved in the software-information memory on the basis of the information illustrated in FIG. 21; and FIG. 23 is a diagram illustrating communication network according to another exemplary embodiment of the invention.

DETAILED DESCRIPTION

Figure 1:
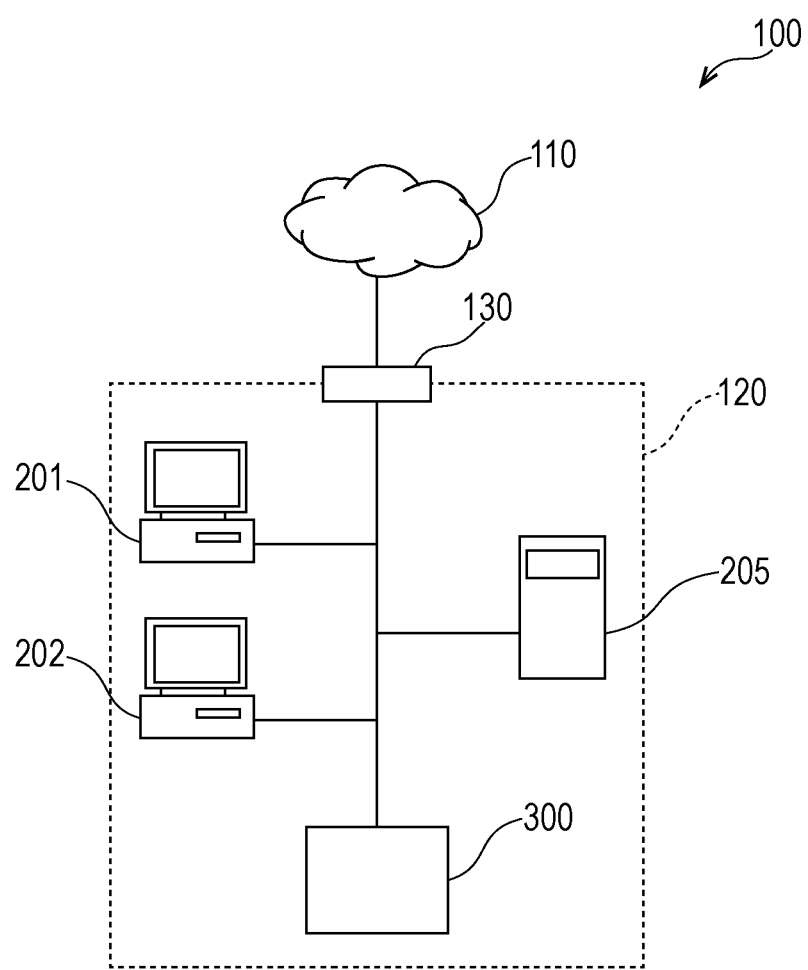
FIG. 1 is a diagram illustrating a communication network according to an exemplary embodiment of the invention.

FIG. 1 is a diagram illustrating a communication network 100 according to an exemplary embodiment of the invention. As illustrated in FIG. 1, the communication network 100 includes an internetwork 110 such as the Internet, an intranet 120 such as a network inside an office, and a gateway 130 that connects the intranet 120 with the internetwork 110. Here, in the intranet 120, information terminals 201 and 202, a server apparatus 205, and an information processing apparatus 300, which is an information processing system, are connected to each other via communication using communication cables or via wireless communication such that electrical communication is possible.

The information terminals 201 and 202 perform processing mainly on information saved therein, information acquired from the server apparatus 205 via the intranet 120, or information acquired from the internetwork 110. The server apparatus 205 supplies information requested mainly by the information terminals 201 and 202; however, the server apparatus 205 may be connected to the internetwork 110 and may have a function for acquiring information to be supplied to the information terminals 201 and 202 or the like.

Devices connected to the intranet 120 (hereinafter also referred to as connected devices) each have a unique address constituted by digital data such as an Internet Protocol (IP) address or the like. In the case where information is transmitted, the information is transmitted to the intranet 120 by specifying a transmission-destination address. In this case, since the intranet 120 according to the exemplary embodiment does not include a relay apparatus having a function for directing information to a transmission destination on the basis of an address of a switch, a switching hub, or the like, all the devices connected to the intranet 120 receive all the information transmitted to the intranet 120. Each of the devices connected to the intranet 120 checks whether the address of received information is the address of the device, and acquires the content of packets only when the address of the received information is the address of the device. When the address of the received information is not the address of the device, the received information is discarded. In the communication network 100, information has been divided into groups (packets) at a transmission source in advance and the packets are sequentially transmitted, the packets each having an amount of information smaller than or equal to a predetermined amount of information. The packets are incorporated and the information obtained before division is reconstructed at a transmission destination.

Figure 2:
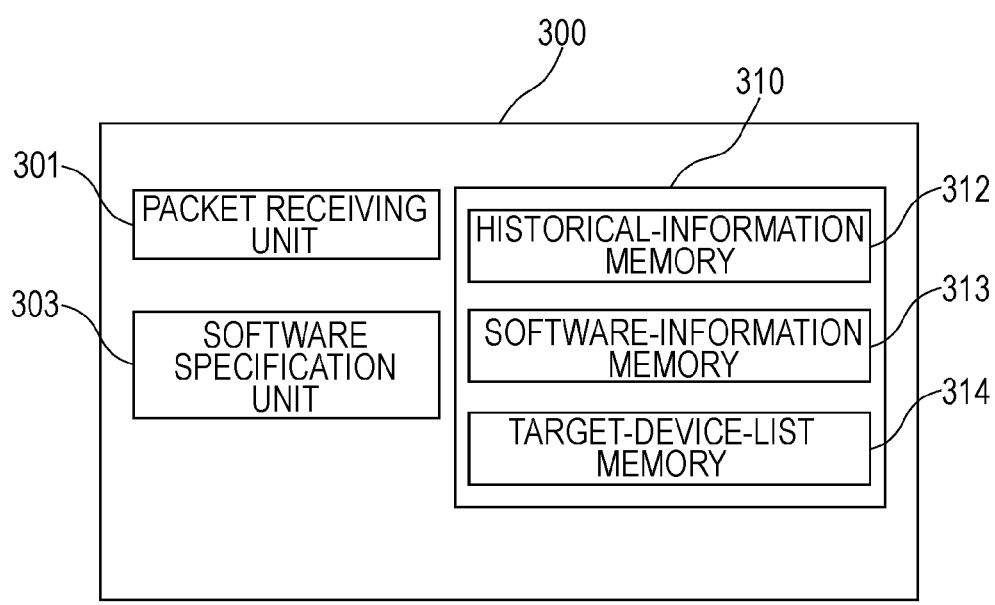
FIG. 2 is a schematic block diagram illustrating the configuration of an information processing apparatus of FIG. 1.

FIG. 2 is a schematic block diagram illustrating the configuration of the information processing apparatus 300. As illustrated in FIG. 2, the information processing apparatus 300 includes a packet receiving unit 301 that receives packets flowing through the intranet 120, a software specification unit 303 that specifies an installed software application from information included in one or more packets, and a memory 310 that includes a magnetic disk device or the like.

Here, the memory 310 includes a historical-information memory 312 that stores communication histories using packets, a software-information memory 313 that stores information on an operating system (OS) and other software applications of a connected device specified by the software specification unit 303 by associating the information with identification information of the connected device, and a target-device-list memory 314 that stores the MAC address of a connected device for which a software application is to be specified (hereinafter referred to as a "target device").

Here, devices connected to the intranet 120 such as the information processing apparatus 300, the information terminals 201 and 202, and the server apparatus 205 each include a central processing unit (CPU), a random-access memory (RAM), a magnetic disk device, and the like. The devices are devices used to process digital information under control performed by a software application stored in a memory such as a magnetic disk device or the like.

Figure 3:
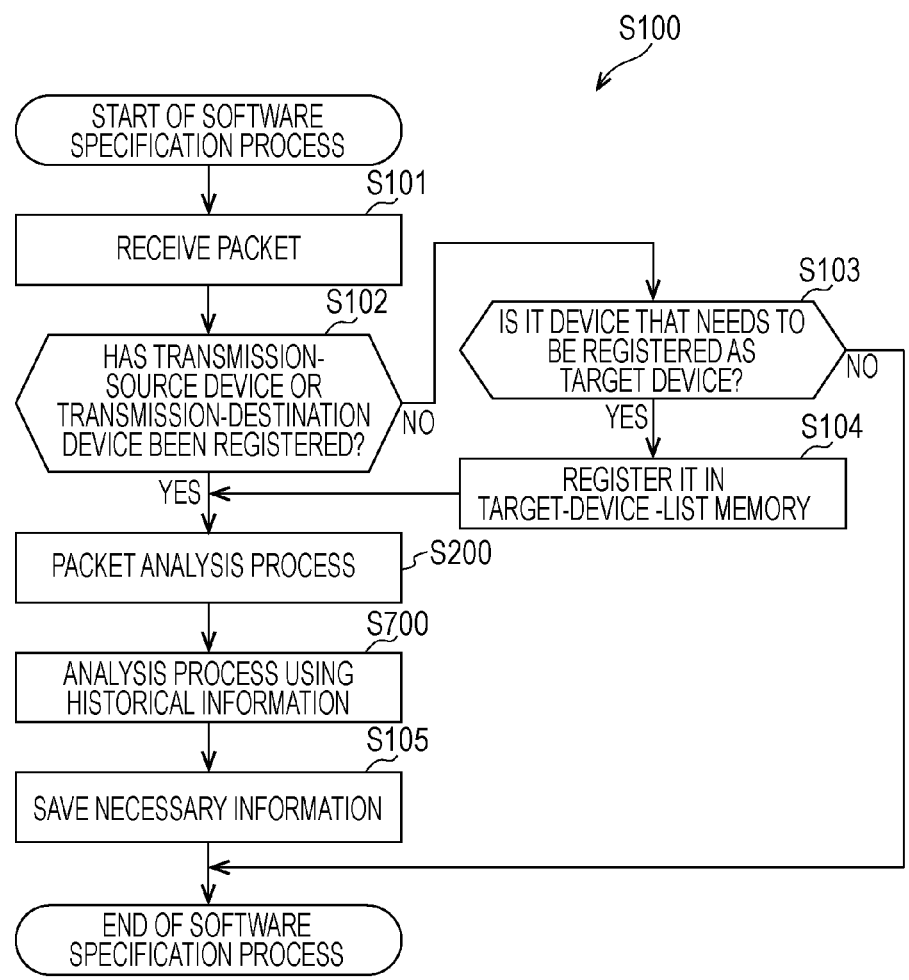
FIG. 3 is a flowchart illustrating a software specification process in the information processing apparatus of FIG. 2.

FIG. 3 is a flowchart illustrating a software specification process S100 in the information processing apparatus 300. As illustrated in this flowchart, in the software specification process S100, packets of communication using the intranet 120 are first received (S101). Next, it is checked whether or not a transmission source or a transmission destination is a registered device (S102). Whether or not a certain device has been registered is determined by whether or not the MAC address of the certain device has been saved in the target-device-list memory 314. When the transmission source or the transmission destination is not registered, it is checked whether or not the transmission source or the transmission destination needs to be registered as a target for which information is to be acquired (S103). When the transmission source or the transmission destination does not need to be registered, either, the software specification process S100 ends. In contrast, when the transmission source or the transmission destination needs to be registered, the transmission source or the transmission destination is registered in the target-device-list memory 314 (S104). Whether or not a certain device needs to be registered may be determined by whether or not the certain device has a MAC address to which an IP address used in a target subnet has been assigned. Thereafter, in the case where the transmission source or the transmission destination is a registered device in step S102 and in the case where the transmission source or the transmission destination is registered in the target-device-list memory 314 in step S104, a packet analysis process S200 and an analysis process S700 using historical information are performed. In the end, necessary information is saved and then the software specification process S100 ends.

In the following, the packet analysis process S200 and the analysis process S700 using historical information of FIG. 3 will be described. Note that each of Google (registered trademark), Mozilla (registered trademark), Windows NT (registered trademark), Windows XP (registered trademark), Windows (registered trademark) 7, Firefox (registered trademark) 19, Firefox (registered trademark) 21, Linux (registered trademark), THUNDERBIRD (registered trademark), Docuworks (trademark), Docuworks Viewer Lite (trademark), and Gecko (trademark) used in the following description and attached drawings is a registered trademark or a trademark.

Figure 4:
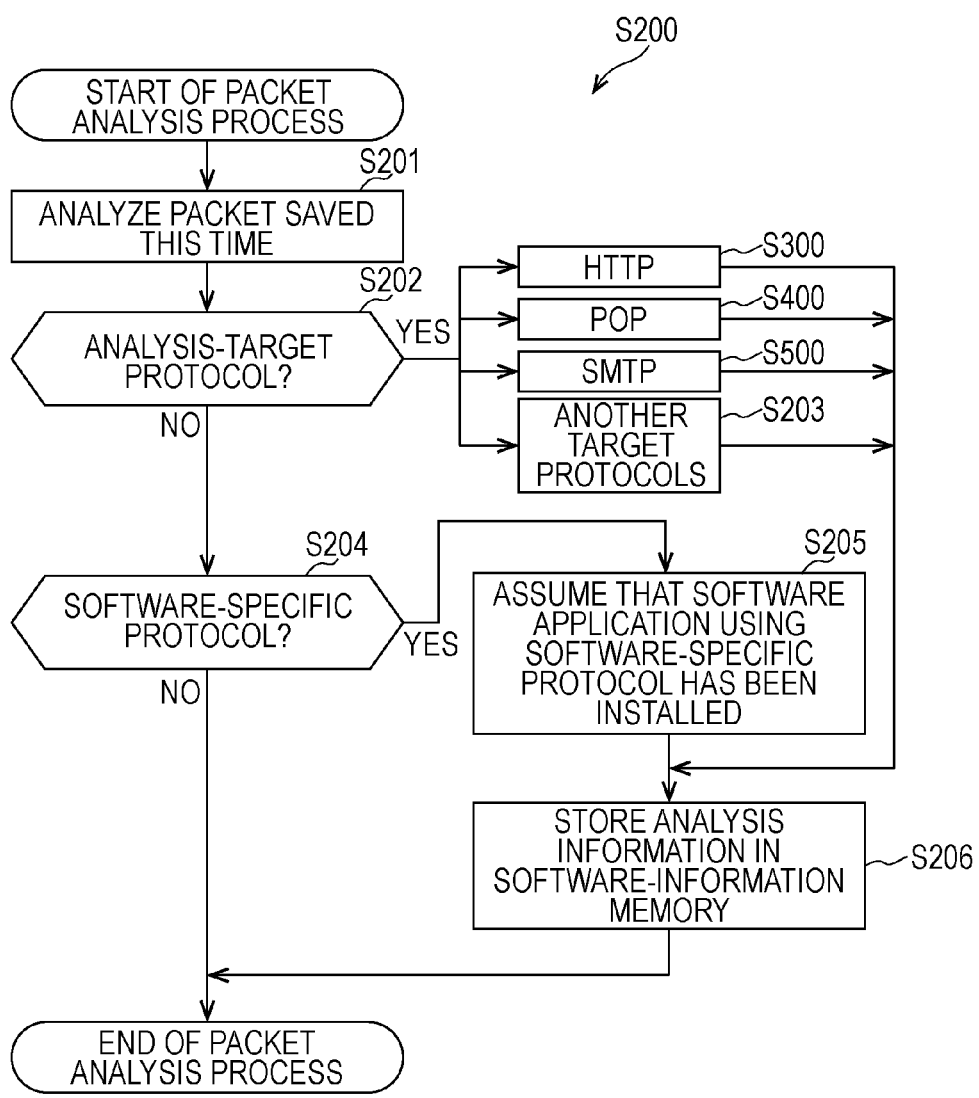
FIG. 4 is a flowchart illustrating a packet analysis process.

FIG. 4 is a flowchart illustrating the packet analysis process S200. As illustrated in this flowchart, packets saved this time are first analyzed (S201). Next, it is determined whether or not a protocol for the packets is an analysis-target protocol on the basis of the analysis result (S202). When the protocol for the packets is Hypertext Transfer Protocol (HTTP), the procedure proceeds to an HTTP process (S300). When the protocol for the packets is Post Office Protocol (POP), the procedure proceeds to a POP process (S400). When the protocol for the packets is Simple Mail Transfer Protocol (SMTP), the procedure proceeds to an SMTP process (S500). When the protocol for the packets is another analysis-target protocol, the procedure proceeds to a process for the other analysis-target protocol (S203). Analysis information obtained as a result of assumption is stored in the software-information memory 313 (S206). Here, when the protocol for the packets is not an analysis-target protocol, it is determined whether or not the protocol for the packets is a software-specific protocol (S204). When the protocol for the packets is a software-specific protocol, it is assumed that a software application using the software-specific protocol has been installed (S205). Analysis information obtained as a result of assumption is stored in the software-information memory 313 (S206). In the case where the protocol for the packets is not a software-specific protocol, either, and in the case where the analysis information is stored, the packet analysis process S200 ends.

Figure 5:
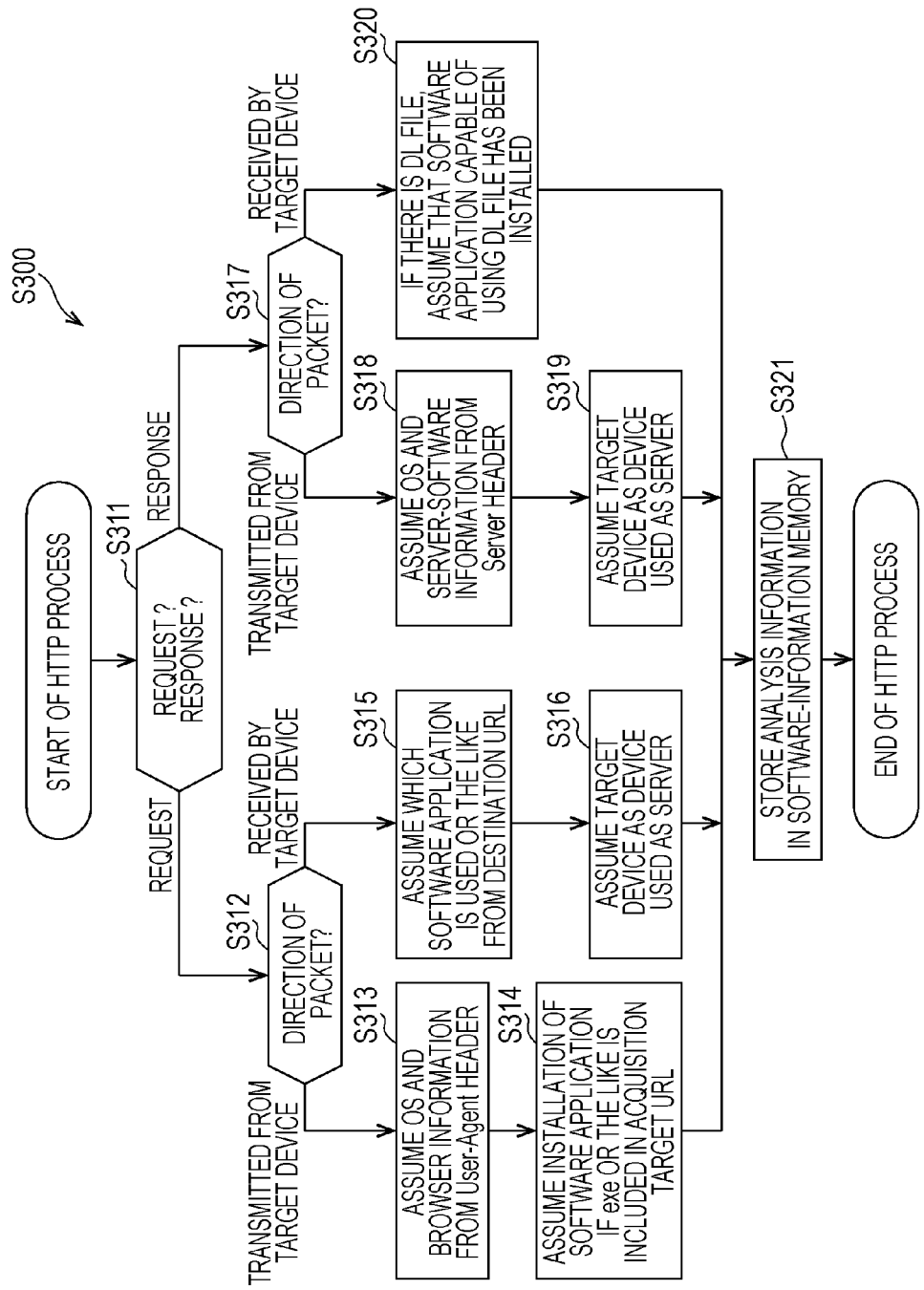
FIG. 5 is a flowchart illustrating an HTTP process.

FIG. 5 is a flowchart illustrating the HTTP process S300 of FIG. 4. As illustrated in this flowchart, it is first determined whether or not an HTTP message is a request or a response message (S311). When the HTTP message is a request message, the direction of the packets is determined (S312). In the case where the packets have been transmitted from a target device, OS and browser information is assumed from a User-Agent header (S313). For example, in FIG. 6, a portion of a header of a communication message transmitted from a target device via HTTP is illustrated. "Windows XP (registered trademark)", "PC?", and "FireFox (registered trademark) 19" are specified on the basis of details described in a "User-Agent" tag illustrated in FIG. 6, and, for example, information on underlined portions of FIG. 7 is saved in the software-information memory 313. Here, it has been registered in advance that an operating system "Windows NT (registered trademark) 5.1" is generally referred to as "Windows XP (registered trademark)".

Here, "PC?" refers to a case where there is a high probability that the target device is used as a personal computer and, in addition, there is a possibility that the target device is used as a server apparatus. The reason why such description is given is that "Windows XP (registered trademark)" is generally used as an OS of a personal computer but may also be used as an OS of a server apparatus. Information including "?" is unconfirmed information; however, even unconfirmed information may be useful information to determine the entirety of the intranet 120 compared with the case where unconfirmed information is not recorded at all. Thus, even unconfirmed information including "?" is registered.

Note that basic information such as a MAC address and an IP address that are not-underlined portions in FIG. 7 has been acquired in advance in the exemplary embodiment. Such information may be acquired via a protocol such as Address Resolution Protocol (ARP), Simple Network Management Protocol (SNMP), Simple Service Discovery Protocol (SSDP), or Internet Control Message Protocol (ICMP). In addition, when such information is acquired, connected devices are listed up and a connected device determined to have insufficient information may be determined to be a target device for the software specification process S100. Note that basic information on a connected device may be acquired by a program executed periodically.

FIG. 8 is a diagram illustrating a portion of a header of another communication message transmitted from the target device via HTTP, the target device being the same as that of FIG. 6. Here, detailed information on the OS shown in the "User-Agent" tag is different from the information on the OS that has been already recognized. Thus, it is conceivable that an OS called "CentOS" and "Windows XP (registered trademark)" are dual booted, "CentOS" is operating in a virtual machine, or the OS of the target device has been replaced. In accordance with such information, information in the software-information memory 313 is updated as illustrated in FIG. 9. In an example illustrated in FIG. 9, a broken line is drawn in order to show that there is a possibility that plural OSes have been installed. More detailed information on an installed software application may be acquired by analyzing such newly acquired information.

Here, in the case where the OS of the target device has been actually replaced, wrong information remains. Historical information as illustrated in FIG. 10 remains in the historical-information memory 312. In the case where, a predetermined period or longer is determined to have passed by referring to this historical information since transmission performed by the other OS, the information on the other OS is deleted. For example, in the case of the historical information of FIG. 10, the information on the other OS is old since the information on the other OS is more than one year old. Thus, the OS of the target device is determined to have been replaced and, as illustrated in FIG. 11, information on "Windows XP (registered trademark)", the previous OS, and applications is deleted. Here, information that is more than one year old is treated as old information; however, a period used to determine old information may be arbitrarily set. Such a period may also differ from item to item. Processing for deleting such old information may also be executed when the software specification process is performed or may be executed periodically. By using historical information in this way, highly probable information may be acquired.

Referring back to FIG. 5, after completion of processing for assuming the OS and browser information in step S313, when an acquisition target URL includes an execution file with an extension such as exe, it may be assumed that the software application of the execution file is to be installed (S314). For example, in the case where there is a message as illustrated in FIG. 12, dwvlt732jpn.exe is an installer for Docuworks Viewer Lite (trademark) and thus it may be assumed that this software application is to be installed. In addition, it is also clear on the basis of the message of FIG. 12 that a browser is Firefox (registered trademark) 21 and an OS is Windows (registered trademark) 7.

Referring back to FIG. 5, when the HTTP message is a request message to be received by the target device, which software application is used or the like is assumed from a destination URL (S315). Furthermore, it may be assumed that the target device is a device used as a server (S316). For example, FIG. 13 illustrates a portion of a header of a communication message to be received by a target device via HTTP. The target device that has received an HTTP request message may operate as an HTTP server. In particular, when the target device returns an HTTP response message as illustrated in FIG. 14 after receiving the HTTP request message, it may be determined that the target device is operating as an HTTP server. It may be determined from the historical information recorded in the historical-information memory 312 that the target device is used as an HTTP server if various devices have accessed the target device. In this communication message illustrated in FIG. 13, furthermore, when a path of a GET target is checked by referring to information stored in advance and extraction data matches the information stored in advance in terms of a path called "pukiwiki.php", it is determined that a software application called PukiWiki has been installed. Information as illustrated in FIG. 15 based on this communication message is saved in the software-information memory 313.

Referring back to FIG. 5, when the HTTP message is a response message, the direction of packets is determined (S317). When transmission is performed from a target device, OS and server-software information is assumed from a Server header (S318). From details illustrated in FIG. 14, information indicating that Apache (the name of an HTTP server) is used may be acquired. From information obtained as a result of assumption, it may be assumed that the target device is used as a server, in this case, as an HTTP server (S319). In addition, when reception is performed by the target device, in particular, in the case where there is a download file or the like, it may be assumed that the software application capable of using the download file or the like has been installed (S320). By performing the above-described process, analysis information obtained as a result of assumption is stored in the software-information memory 313 (S321).

Figure 16:
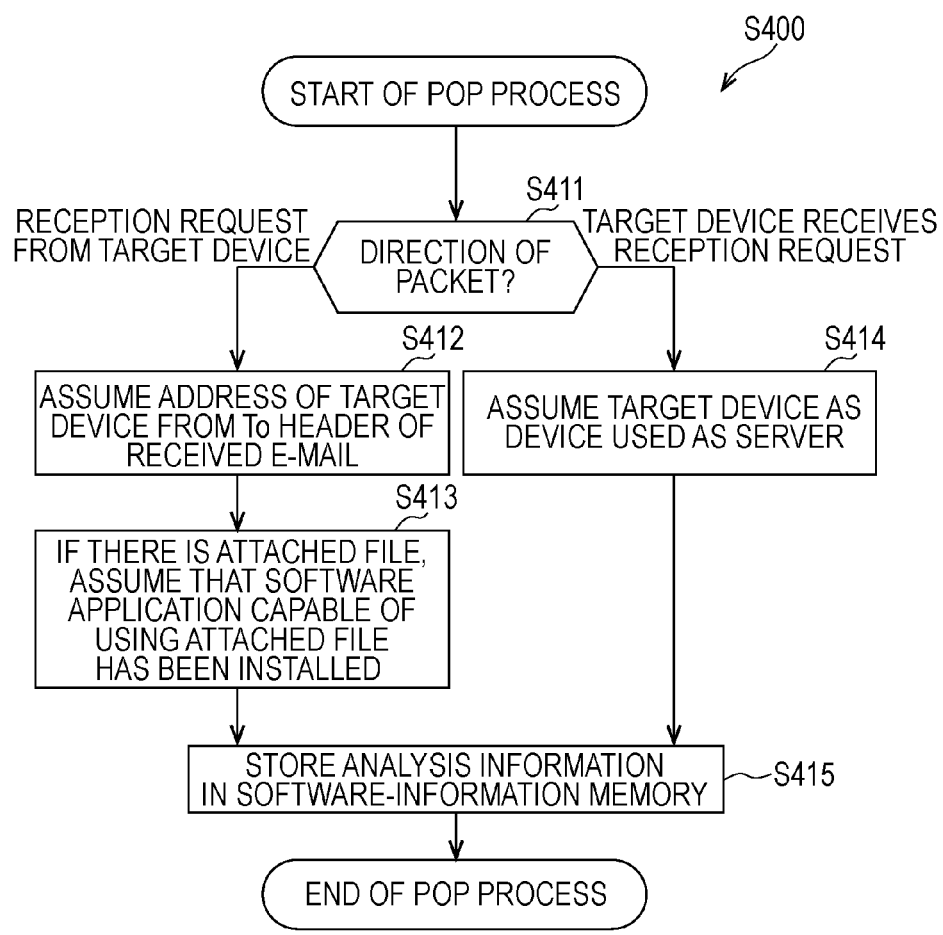
FIG. 16 is a flowchart illustrating an example of a POP process.

FIG. 16 is a flowchart illustrating an example of a POP process S400. As illustrated in this flowchart, the direction of packets is first determined (S411). Here, when a reception request is issued by a target device, the address of the information processing apparatus 300 is assumed from a "To" tag of a header of a received e-mail (S412). Thereafter, when there is an attached file, it is assumed from the attached file that a software application capable of using the attached file has been installed (S413). In contrast, a reception request is received by the target device, it is assumed that the target device is a device used as a mail server (S414). Analysis information obtained as a result of assumption is stored in the software-information memory 313 (S415).

FIG. 17 is a flowchart illustrating an example of a SMTP process S500. As illustrated in this flowchart, the direction of packets is first determined (S511). Here, a transmission request is issued by a target device, the address of the information processing apparatus 300 is assumed from details of a "MAIL FROM" command (S512). Next, OS and mailer information is assumed from a "User-Agent" header (S513). Thereafter, it is assumed from the attached file that a software application capable of using the attached file has been installed (S514). In contrast, when a transmission request is received by the target device, it is assumed that the target device is a device used as a mail server (S515). Analysis information obtained as a result of assumption is stored in the software-information memory 313 (S516).

FIG. 18 is a diagram illustrating an example of an SMTP message. In FIG. 18, it is clear from the "User-Agent" header that "Windows 7 (registered trademark)" and "Thunderbird (registered trademark) 17.0.7" have been installed. In addition, since "dwvlt732jpn.exe" has been transmitted as an attached file, it is assumed that "dwvlt732jpn.exe" is to be installed at a reception device. Furthermore, it is clear that the address of a transmission-source device is "yyy@xxx.xxx.com".

FIG. 19 is a flowchart illustrating the analysis process S700 using historical information. As illustrated in this flowchart, historical information is first analyzed (S701). Next, it is determined whether or not the protocol for the packets is an analysis-target protocol on the basis of an analysis result (S702). When the protocol for the packets is SNMP (S703), it is assumed that an SNMP agent software application has been installed (S704). When the protocol for the packets is POP, the procedure proceeds to a POP process (S810). When the protocol for the packets is SMTP, the procedure proceeds to an SMTP process (S820). When the protocol for the packets is another analysis-target protocol, the procedure proceeds to a process corresponding to the other analysis-target protocol (S705). Here, when the protocol for the packets is not an analysis-target protocol (S702), it is determined whether or not periodic transmission is performed to a fixed destination with a constant frequency (S706). When YES, it is assumed that a software application closely associated with a transmission-source server has been installed (S707). Thereafter, analysis information obtained as a result of assumption is stored in the software-information memory 313 (S708). In the case of NO and in the case where the analysis information is stored, the analysis process S700 ends.

FIG. 20 is a flowchart illustrating a POP·SMTP process S800 corresponding to the POP process S810 and the SMTP process S820 of FIG. 19. As illustrated in FIG. 20, the direction of packets is first determined (S831). When transmission is performed from a target device, it is determined whether or not the target device has transmitted a file obtained by editing a file received in the past (S832). When YES, it is assumed that a software application capable of using an attached file has been installed (S833), and analysis information obtained as a result of assumption is stored in the software-information memory 313 (S834). For example, in the case where the extension of the file transmitted by the target device and received by the information processing apparatus 300 is "xdw", this extension is used by a software application called Docuworks (trademark). Thus, it may be determined that it is very likely that a viewer for Docuworks (trademark) has been installed in the target device. Furthermore, as illustrated in FIG. 21, the historical information recorded in the historical-information memory 312 illustrates a case where a file called "aaa.xdw" is first transmitted from a connected device having ID21 to a connected device having ID20 and then transmitted from the connected device having ID20 to the connected device having ID21 at a later date. In this case, when the hash value of the file transmitted from the connected device having ID21 to the connected device having ID20 is different from that of the file transmitted from the connected device having ID20 to the connected device having ID21, it may be determined that it is very likely that an editor for Docuworks (trademark) has been installed in the connected device having ID20 since it is very likely that the file has been edited by the connected device having ID20, the hash values being recorded in the historical information. As a result, information illustrated in FIG. 22 may be saved in the software-information memory 313.

The extension is not particularly limited to "xdw", and various extensions may be used. In such a case, if a software application or applications using a target extension are limited, it may increase the accuracy of determination of an installed software application or applications. In addition, in the case where, in the historical information, a file used to install a certain software application is received and then a file having an extension used by the software application is transmitted/received, it may be determined that the certain software application has been installed.

In addition, an installed software application may be specified by extracting a periodically transmitted communication message from the historical information recorded in the historical-information memory 312. For example, it may be determined that an SNMP manager software application has been installed, by extracting a periodically transmitted communication message containing SNMP packets. Furthermore, by extracting a communication message accessing an external server apparatus managing an antivirus software application with a high frequency, it may be determined that the antivirus software application has been installed, which is an antivirus software application of a software company having the external server apparatus. Furthermore, in the case where communication is performed via a protocol unique to a certain application, it may be determined that the certain application has been installed in both of a transmission-source connected device and a transmission-destination connected device.

Note that, in the exemplary embodiment, description has been made such that the packet receiving unit 301 and the software specification unit 303 of the information processing apparatus 300 are incorporated in one apparatus, however, may be configured as an information processing system in which the packet receiving unit 301 and the software specification unit 303 are separately connected to a network.

FIG. 23 is a diagram illustrating a communication network 800 according to another exemplary embodiment of the invention. In FIG. 23, components the same as those in FIG. 1 are denoted by the same reference numerals and redundant description will be omitted. A difference between the communication network 800 and the communication network 100 of FIG. 1 in the intranet 820 is that the communication network 800 includes networks 610 and 620 that are separated from each other by a relay apparatus 600 such as a switch or a switching hub. In the case where packets need to be transmitted to only one of the networks 610 and 620, the relay apparatus 600 prevents the packets from being transmitted to the other one of the networks 610 and 620. In the case where packets need to be transmitted to both the networks 610 and 620, the relay apparatus 600 transmits the packets to both the networks 610 and 620. Thus, in the case where the information processing apparatus 300 is arranged in either of the networks 610 and 620, there is a possibility that there are packets that the information processing apparatus 300 is incapable of acquiring. The relay apparatus 600 in this exemplary embodiment has a function of the information processing apparatus 300 of FIG. 1 and may acquire packets that are blocked between the networks 610 and 620 and communication information. Details of the software specification process S100 performed in the relay apparatus 600 are similar to those performed in the information processing apparatus 300, and thus description thereof will be omitted. With such a configuration, this exemplary embodiment may have effects similar to those of the communication network 100 of FIG. 1 according to the exemplary embodiment.

Note that, in the case where there is a relay device such as a switch or a switching hub, an information communication terminal that executes the software specification process S100 is arranged as the relay apparatus in the configuration of FIG. 23; however, plural information processing apparatuses may also be arranged.

In addition, the software specification process is executed when new connected-device information is acquired in the above-described exemplary embodiments; however, timings of execution of the software specification process may be arbitrarily set. Examples of the timings include a timing at which a user instructs and periodical timings.

In addition, in the above-described exemplary embodiments, a program that executes a process may be stored in an internal memory such as a magnetic disk device, and may also be provided by being stored in a storage medium such as a compact disc read-only memory (CD-ROM).

Furthermore, the configurations of the communication networks 100 and 800 of the above-described exemplary embodiments are mere exemplary embodiments of the invention. Technical ideas and the minimum configuration of an information processing system according to an exemplary embodiment of the invention are based on the claims.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a packet receiving unit configured to receive a packet flowing in a communication network;
a registration unit configured to register one or more devices connected to the communication network; and
a software specification unit configured to specify a software application installed in a registered device among the one or more registered devices, on the basis of information regarding a file contained in the packet, the packet being transmitted or received by the registered device,
wherein the software specification unit is further configured to specify the software application on the basis of information indicating that content of a file that contains information regarding a file contained in a packet transmitted from the registered device has been obtained by editing content of a file that contains information regarding a file contained in a packet received by the registered device.

2. An information processing method comprising:
receiving a packet flowing in a communication network;
registering one or more devices connected to the communication network;
specifying a software application installed in a registered device among the one or more registered devices, on the basis of information regarding a file contained in the packet, the packet being transmitted or received by the registered device;
specifying a plurality of software applications installed in the registered device; and
deleting information on a software application among the plurality of software applications in a case where a certain period has passed before installation of the software application is confirmed.

3. A non-transitory computer readable medium storing a program causing a computer to execute a process, the process comprising:
receiving a packet flowing in a communication network;
registering one or more devices connected to the communication network;
specifying a software application installed in a registered device among the one or more registered devices, on the basis of information regarding a file contained in the packet, the packet being transmitted or received by the registered device;
specifying a plurality software applications installed in the registered device on the basis of content of a packet that uses a type of communication protocol the same as that used by the packet transmitted from the registered device; and
deleting information on a software application among the plurality of software applications in a case where the software application has not performed transmission via the type of communication protocol for a certain period.

* * * * *